United States Patent
Martin et al.

(10) Patent No.: US 11,318,977 B1
(45) Date of Patent: May 3, 2022

(54) LIFT/MOVING SYSTEM

(71) Applicant: Wells Fargo Bank, N.A., San Francisco, CA (US)

(72) Inventors: Robert Martin, Plymouth, MN (US); Scott Bristol, Hudson, WI (US); Kelly Fulmer, Plymouth, MN (US); Joseph LaCoco, Minnetonka, MN (US); Ryan Murphy, Brooklyn Park, MN (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 0 days.

(21) Appl. No.: 16/997,617

(22) Filed: Aug. 19, 2020

Related U.S. Application Data

(62) Division of application No. 15/805,305, filed on Nov. 7, 2017, now Pat. No. 10,800,439.

(60) Provisional application No. 62/419,591, filed on Nov. 9, 2016.

(51) Int. Cl.
*B62B 5/00* (2006.01)
*B60P 3/40* (2006.01)
*B66F 3/46* (2006.01)

(52) U.S. Cl.
CPC ............. *B62B 5/0086* (2013.01); *B60P 3/40* (2013.01); *B66F 3/46* (2013.01)

(58) Field of Classification Search
CPC ............. B60P 3/40; B62B 5/0086; B66F 3/46
See application file for complete search history.

(56) References Cited

U.S. PATENT DOCUMENTS

| | | | | |
|---|---|---|---|---|
| 3,494,492 A | * | 2/1970 | Thiermann | B66C 19/02 414/461 |
| 3,768,676 A | * | 10/1973 | Spitzer | B66F 19/00 414/459 |
| 3,831,791 A | * | 8/1974 | Gonzales | B66C 19/02 414/461 |
| 4,897,011 A | * | 1/1990 | Brower | B66F 7/12 254/2 R |
| 4,934,893 A | * | 6/1990 | Johnson | B62B 3/06 254/2 R |
| 5,044,864 A | * | 9/1991 | Stefan | B60B 33/06 254/45 |
| 7,431,552 B2 | * | 10/2008 | Laursen | B65G 7/06 414/458 |
| 7,438,301 B2 | * | 10/2008 | Schilling | A47F 5/108 280/47.15 |
| 8,967,592 B2 | * | 3/2015 | Cozza | B62B 1/26 254/2 R |
| 9,592,998 B2 | * | 3/2017 | Pilgrim | B66C 19/005 |
| 9,694,936 B2 | * | 7/2017 | DeBattiste | B66F 3/24 |
| 10,173,874 B2 | * | 1/2019 | Embleton | B66F 9/00 |

(Continued)

FOREIGN PATENT DOCUMENTS

WO WO-2015145096 A1 * 10/2015 ........... B62B 5/0086

*Primary Examiner* — James Keenan
(74) *Attorney, Agent, or Firm* — Kilpatrick Townsend & Stockton LLP

(57) ABSTRACT

An interconnected cabinet moving system for Information Technology (IT) equipment is disclosed that includes a support assembly that supports the interconnected cabinets, lifting devices engaged with the support assembly that lifts and moves the support assembly, and a stabilizer assembly attached to the lifting devices that extends over the interconnected cabinets and to stabilize the interconnected cabinets.

20 Claims, 17 Drawing Sheets

(56) References Cited

U.S. PATENT DOCUMENTS

| | | | | |
|---|---|---|---|---|
| 2003/0180132 A1* | 9/2003 | Morreim | ............... | B66C 19/005 |
| | | | | 414/458 |
| 2008/0054580 A1* | 3/2008 | Glaser | ................... | B62B 5/0083 |
| | | | | 280/35 |
| 2011/0274531 A1* | 11/2011 | Boelter | ..................... | B66F 3/46 |
| | | | | 414/800 |
| 2012/0256060 A1* | 10/2012 | West | ........................ | B65G 7/04 |
| | | | | 248/157 |
| 2018/0050715 A1* | 2/2018 | Cozza | ................... | B62B 5/0086 |

* cited by examiner

- PRIOR ART -

LIFT/MOVING SYSTEM

CROSS-REFERENCE TO RELATED APPLICATIONS

This application is a divisional of, and claims priority of U.S. patent application Ser. No. 15/805,305 entitled "LIFT/MOVING SYSTEM" FILED ON Nov. 7, 2017 which claims the benefit of U.S. Provisional Patent Application Ser. No. 62/419,591 entitled "LIFT/MOVING SYSTEM" filed on Nov. 9, 2016; the entirety of each of the above-noted applications is incorporated by reference herein.

ORIGIN

The present invention relates generally to a lift system and more specifically, to a lift and moving system for computer server cabinets.

BACKGROUND

Referring to FIG. 1, at times it is required to relocate (as indicated by the arrows in FIG. 1) IT equipment (e.g., servers, data storage devices, network devices, etc.) disposed in cabinets within an IT data center 100 for various reasons. This is typically accomplished by decommissioning the IT equipment and re-installing devices into different cabinets. This may be satisfactory for IT environments where there are no cross-dependent dependencies. In IT environments where there are cross-cabinet dependencies (e.g., power, cabling, etc.), however, simply decommissioning and fully dismantling the IT equipment and re-engineering and re-installing it into other cabinets (or moving the existing cabinets) requires a large amount (e.g., days or weeks) of downtime, which is extremely costly.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

In an aspect of the innovation, an interconnected cabinet moving system is disclosed that includes a support assembly configured to support the interconnected cabinets, lifting devices engaged with the support assembly and configured to lift and move the support assembly, and a stabilizer assembly attached to the lifting devices that extends over the interconnected cabinets and configured to stabilize the interconnected cabinets.

In another aspect of the innovation, a method of relocating interconnected IT cabinets is disclosed that includes positioning the cross members under feet of each interconnected IT cabinet whereby the feet rest on the cross members, attaching both ends of the cross members to bottom side supports, positioning lifting devices adjacent to both bottom side supports such that a horizontal portion of a fork assembly is positioned on a top surface of the bottom side supports, placing a top side support over the horizontal portion of the fork assembly, securing the top side support to the bottom side support via fasteners, attaching a first end of vertical stabilizer supports to a stabilizer connection tube disposed on the lifting devices; attaching pair of stabilizer tube connecting portions to a second end of the stabilizer supports; lifting simultaneously the IT cabinets off a floor surface; and rolling simultaneously the IT cabinets to a new location.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

The present invention may take physical form in certain parts and arrangement of parts, the preferred embodiment of which will be described in detail in the specification and illustrated in the accompanying drawings which form a part hereof, and wherein.

DESCRIPTION

Figure 1:
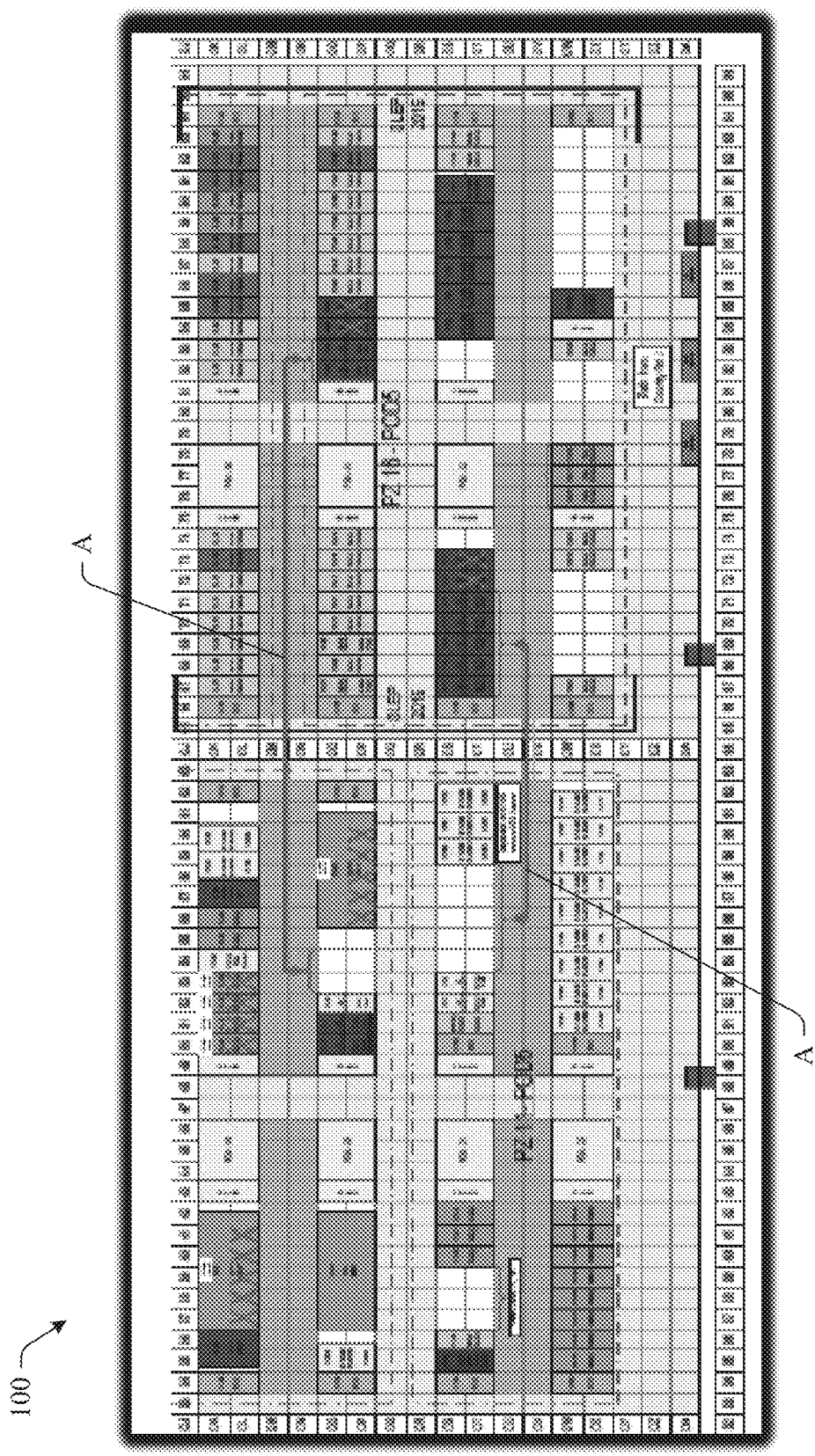
FIG. 1 is a floor plan of an Information Technology (IT) Data Center illustrating the relocation of IT cabinets.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

The innovation disclosed herein overcomes the aforementioned disadvantages by providing lift and moving system to relocate multiple cross-dependent or multi-frame (e.g., IT cabinets and IT equipment disposed therein mechanically and electrically connected) IT cabinets without disrupting cross-cabinet dependencies. The system utilizes weight distribution per technology manufacture's specifications without touching the equipment. The system is designed to simulate the floor and allow lifting of the cabinets while keeping the structural integrity of the cabinets intact.

Figure 2:
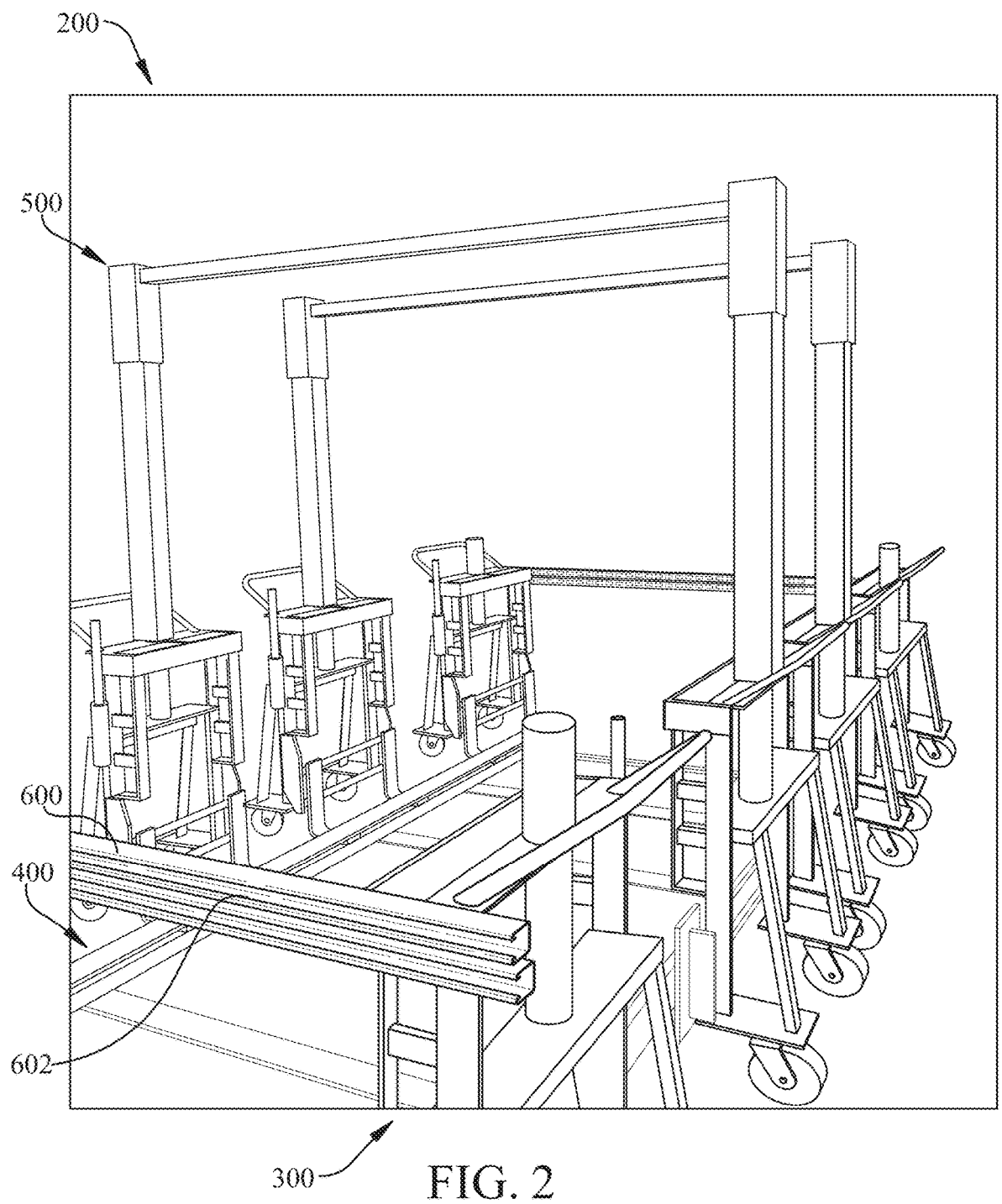
FIG. 2 is a perspective view of an innovative lift and moving system for Information Technology (IT) cabinets that contain IT equipment in accordance with an aspect of the innovation.
Figure 3:
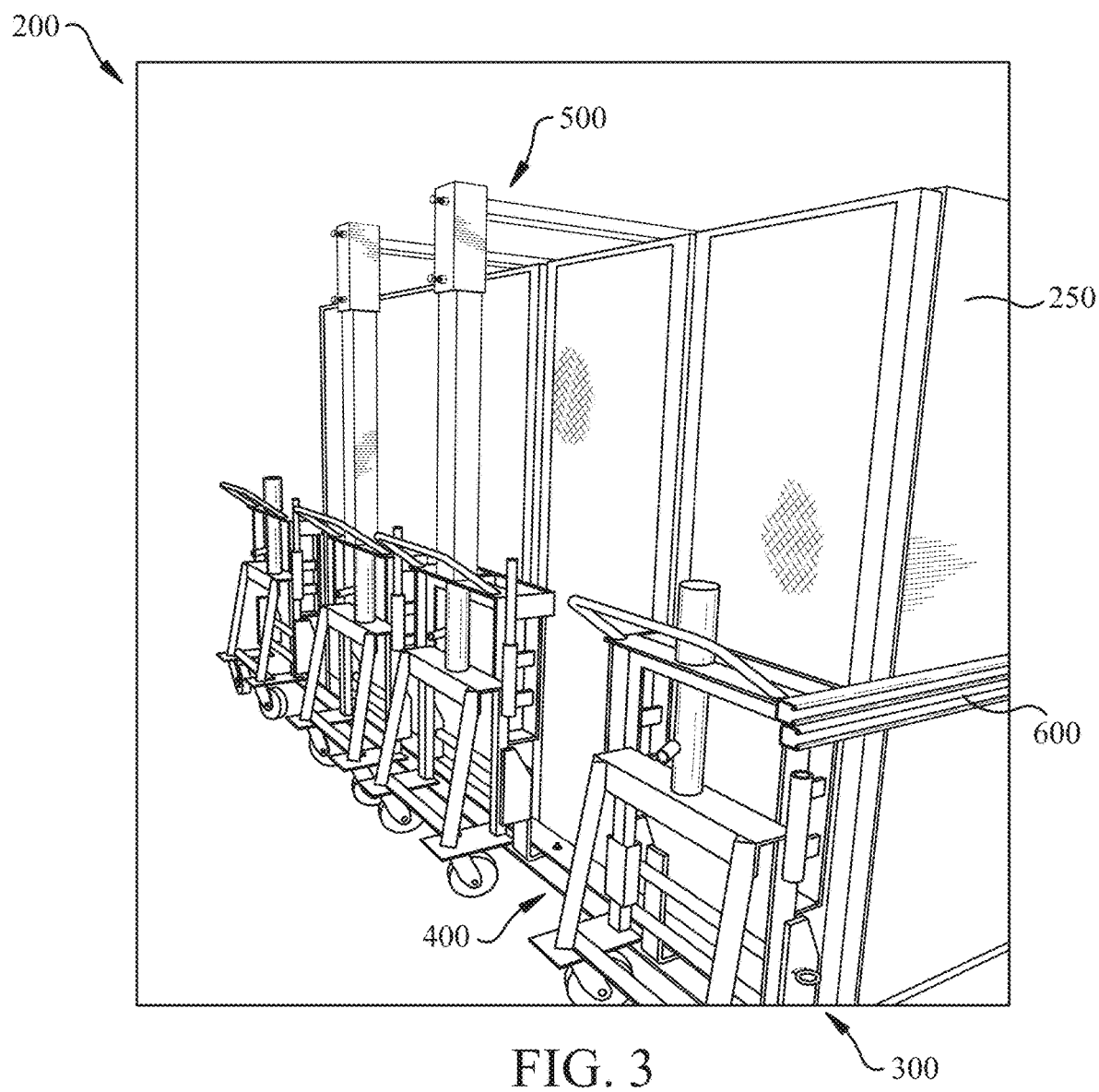
FIG. 3 is a perspective view of the innovative lift and moving system shown with IT cabinets ready for transport in accordance with an aspect of the innovation.
Figure 4:
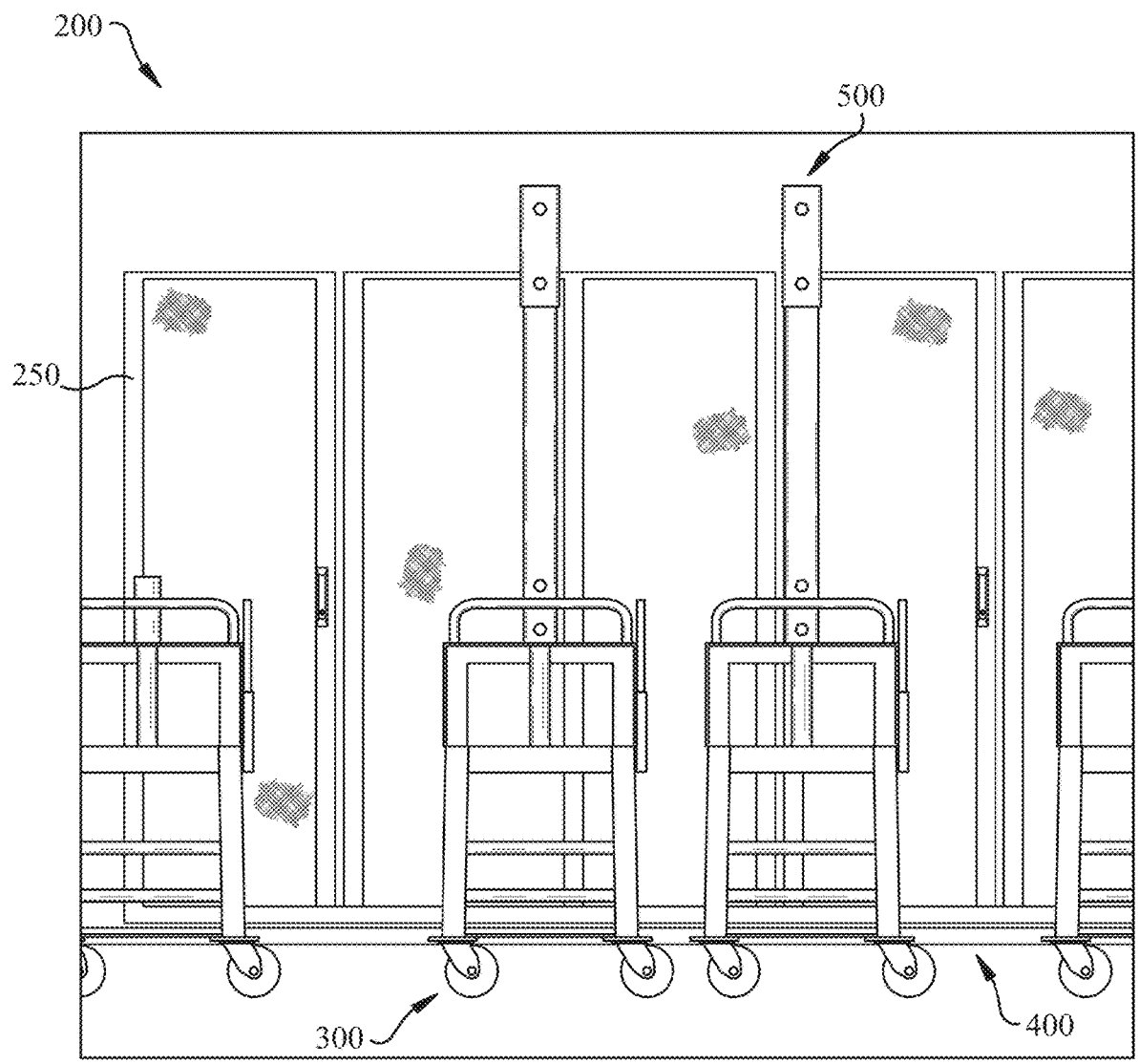
FIG. 4 is a side view of the innovative lift and moving system shown with IT cabinets ready for transport in accordance with an aspect of the innovation.

Referring now to the drawings, FIG. 2 is a perspective view of innovative lift and moving system (hereinafter "moving system") 200 configured to relocate cabinets (frames) that contain Information Technology (IT) equipment, such as but not limited to, servers, data storage devices, networks devices, etc. in accordance with an aspect of the innovation. FIGS. 3 and 4 are perspective and side views of the innovative moving system 200 shown with cabinets 250 loaded onto the moving system 200. The moving system 200 is configured to lift and move multiple cabinets where the cabinets are mechanically or electrically interconnected and/or where the equipment disposed therein is mechanically or electrically connected between multiple cabinets. The moving system 200 includes lifting/moving devices 300, a support assembly 400, one or more stabilizer support assemblies 500, and end braces (brackets) 600.

Referring to FIGS. 2-5, the lifting/moving device 300 includes a frame 310, a movable fork assembly 320 attached to the frame 310, a lifting mechanism 340 attached to the frame 310, a stabilizer connection tube 360 attached to the frame 310, a handle 370 attached to a top of the frame 310, and wheels 380 attached to a bottom of the frame 310. The fork assembly 320 includes a pair of forks 322 having cross connecting bars 324, a first (vertical) portion 326, and a second (horizontal) portion 328 connected to a bottom of the first portion 326 and extending in a substantially horizontal direction away from the frame 310. The fork assembly 320 is configured to engage the support assembly 400 when lifting/moving the cabinets 250 as will be described further below.

The lifting mechanism 340 is attached to a first (lower) cross support 342 on the frame 310 and is a jack type mechanism that moves the fork assembly 320 in a substantially vertical direction to lift the support assembly 400 and ultimately, the cabinets 250 off the floor surface. The lifting mechanism 340 may be any type of lifting mechanism, such as, but not limited to, a screw type mechanism, a scissor type mechanism, a hydraulic jack, a pneumatic jack, etc.

The stabilizer tube 360 is attached to a second (upper) cross support 362 on the frame 310 and is configured to engage an end of the stabilizer assembly 500 as will be described further below. The stabilizer tube 360 is also configured to receive the lifting mechanism 340 when the lifting mechanism 340 moves the fork assembly 320 off the floor surface.

The handle 370 is also attached to the second cross support 362 and is used to transport the moving system 200 when loaded with cabinets 250 or to move the lifting/moving device 300 when not in use.

Referring to FIGS. 5-12, the support assembly 400 is configured to support the cabinets 250 during movement from one location to another. The support assembly 400 includes a pair of side support assemblies 402 and multiple cross members comprised of a pair of end cross members 404, and multiple intermediate cross members 406. For reference, reference number 407 refers to the ends of the support assembly 400 and reference number 409 refers to the sides of the support assembly 400.

Figure 5:
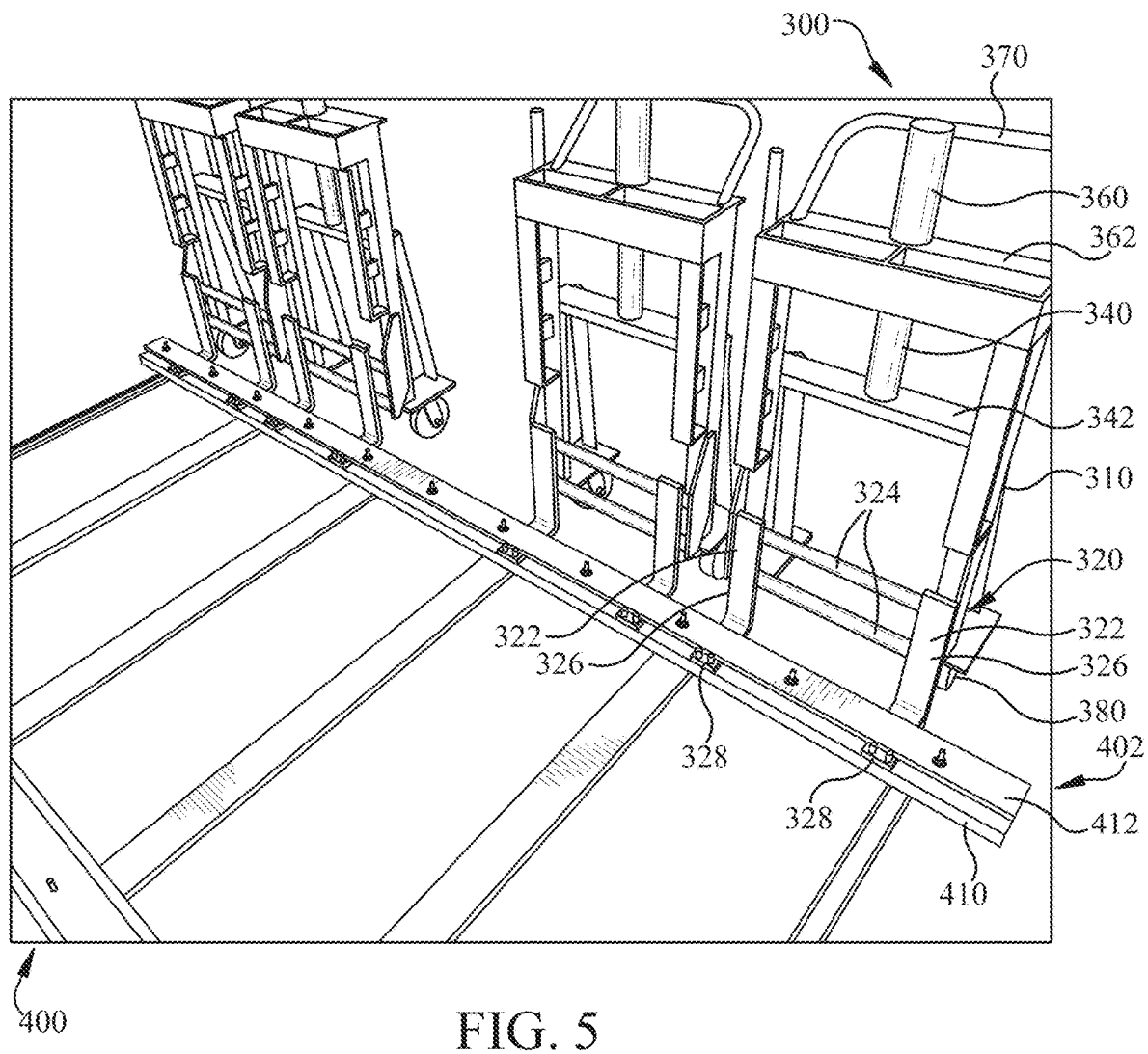
FIG. 5 is a view of lifting devices and a support assembly of the innovative lift and moving system in accordance with an aspect of the innovation.
Figure 6:
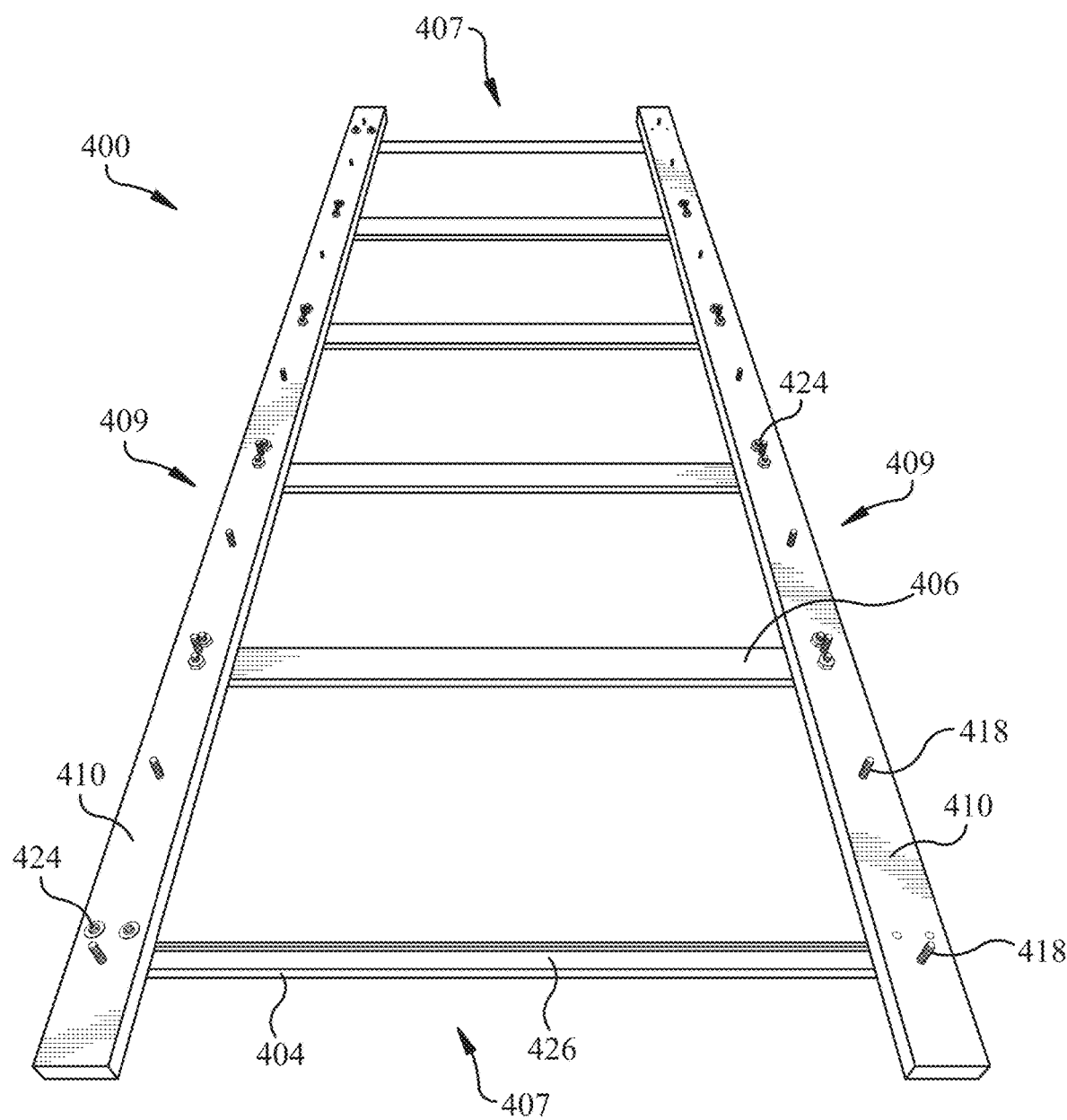
FIG. 6 is a top perspective view of a bottom side support and cross members of the support assembly in accordance with an aspect of the innovation.
Figure 7:
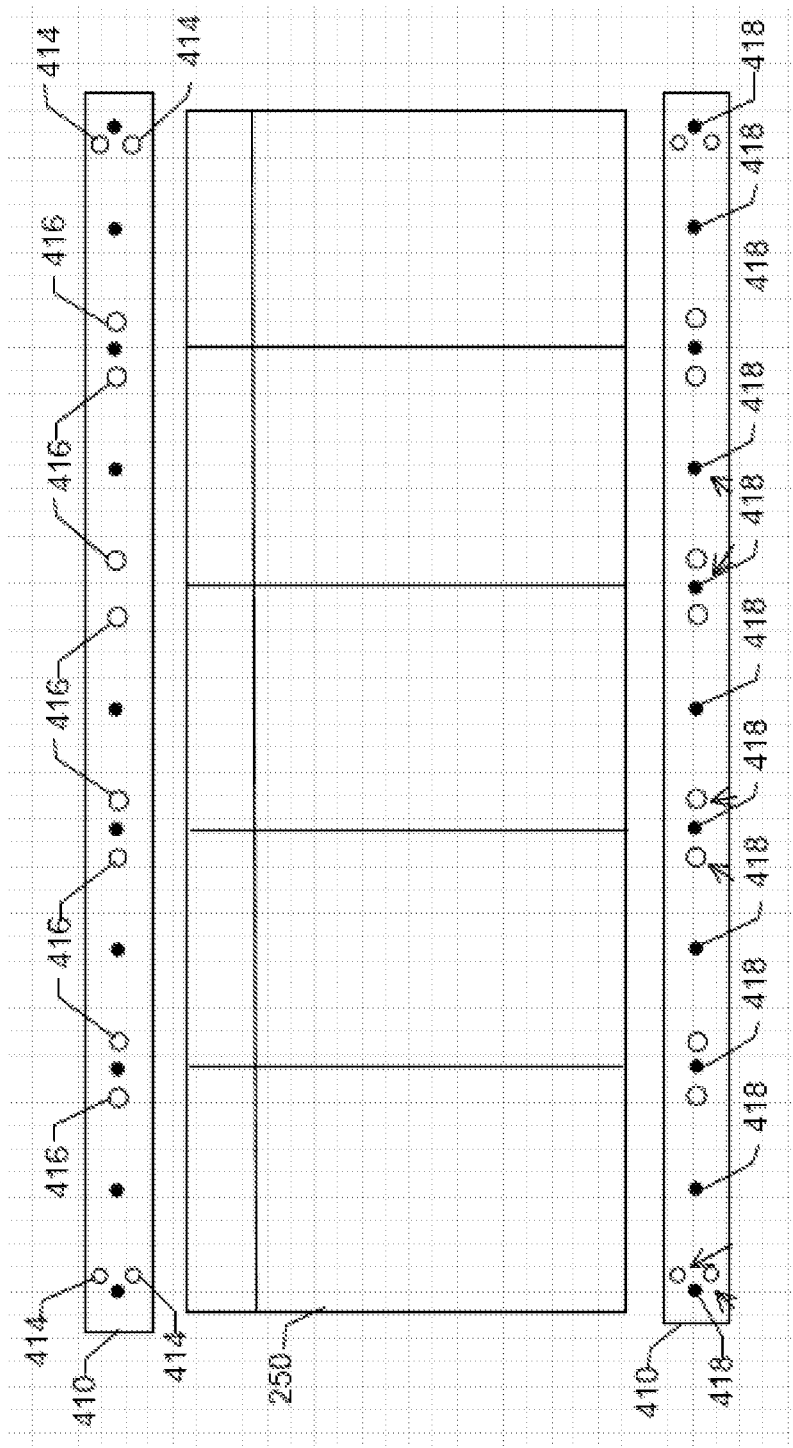
FIG. 7 is a top schematic view of the bottom side support of the support assembly in position with respect to the IT cabinets in accordance with an aspect of the innovation.
Figure 8:
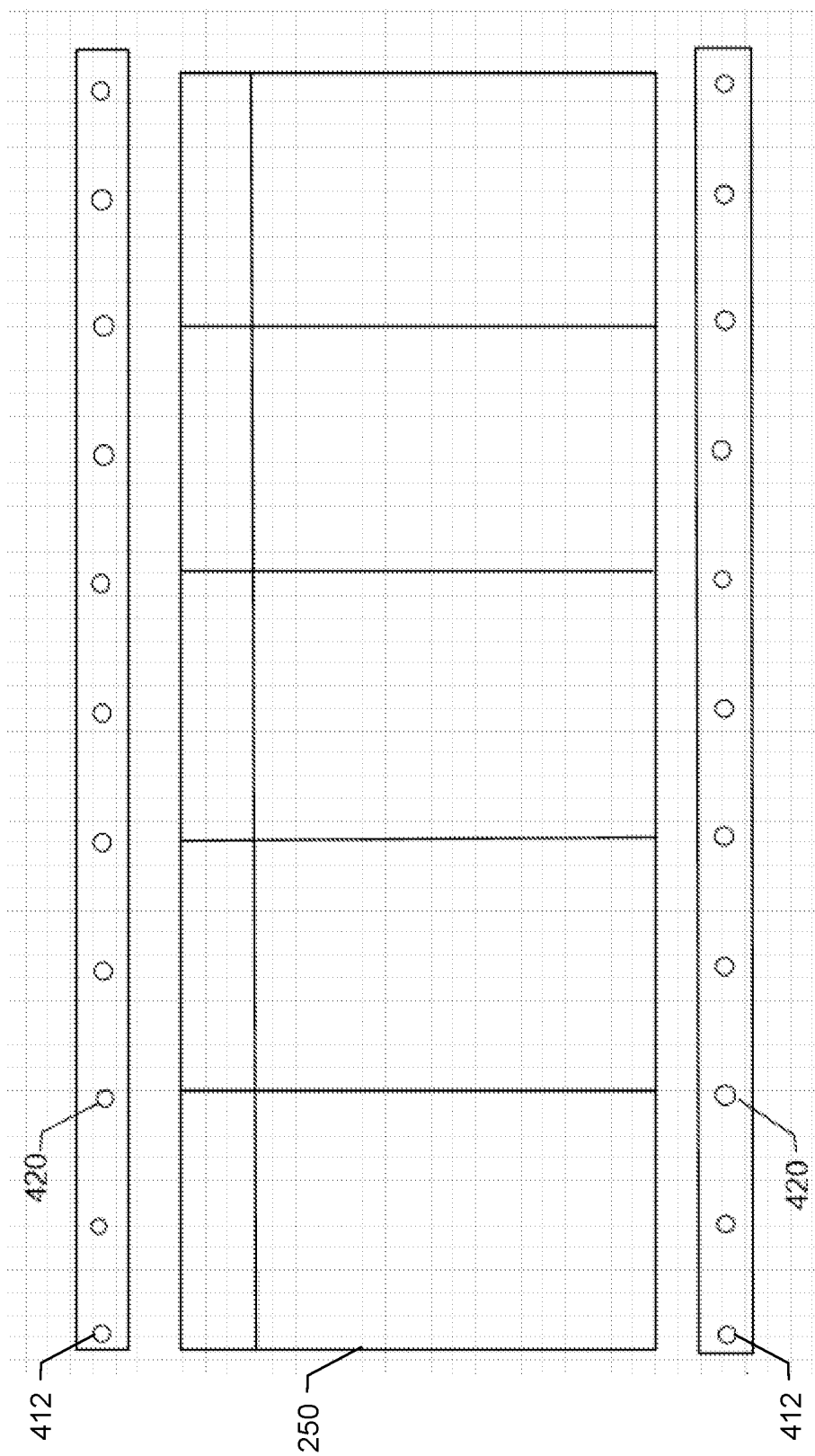
FIG. 8 is a top schematic view of a top side support of the support assembly in position with respect to the IT cabinets in accordance with an aspect of the innovation.
Figure 9:
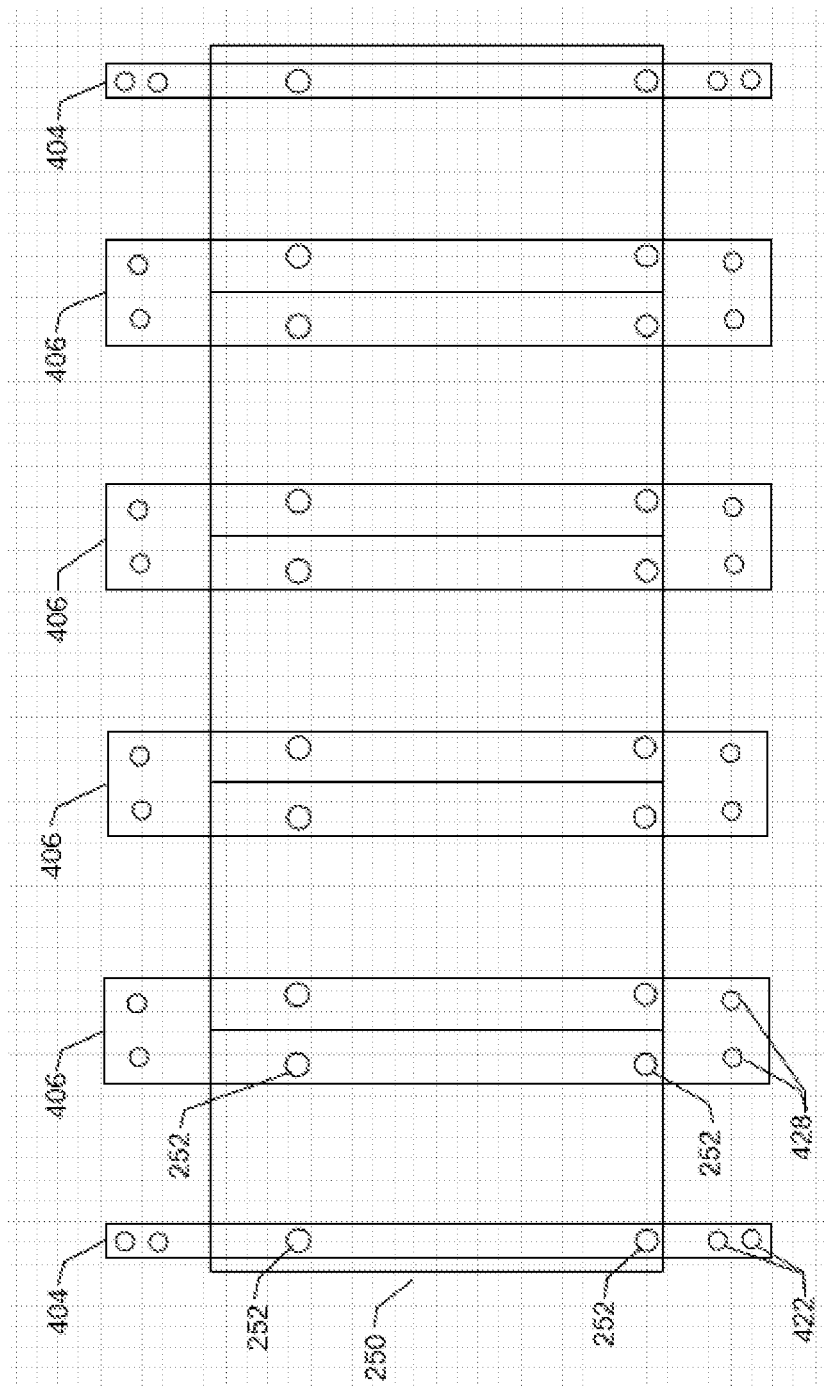
FIG. 9 is a top schematic view of the cross members of the support assembly in position with respect to the IT cabinets in accordance with an aspect of the innovation.
Figure 10:
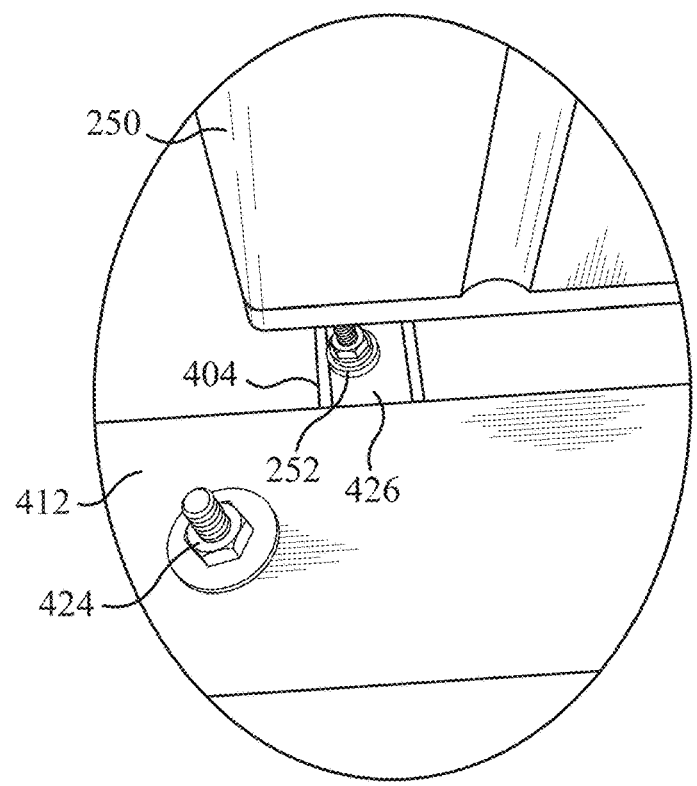
FIG. 10 is a close-up view of an end cross member attached to the bottom side support in accordance with an aspect of the innovation.
Figure 12:
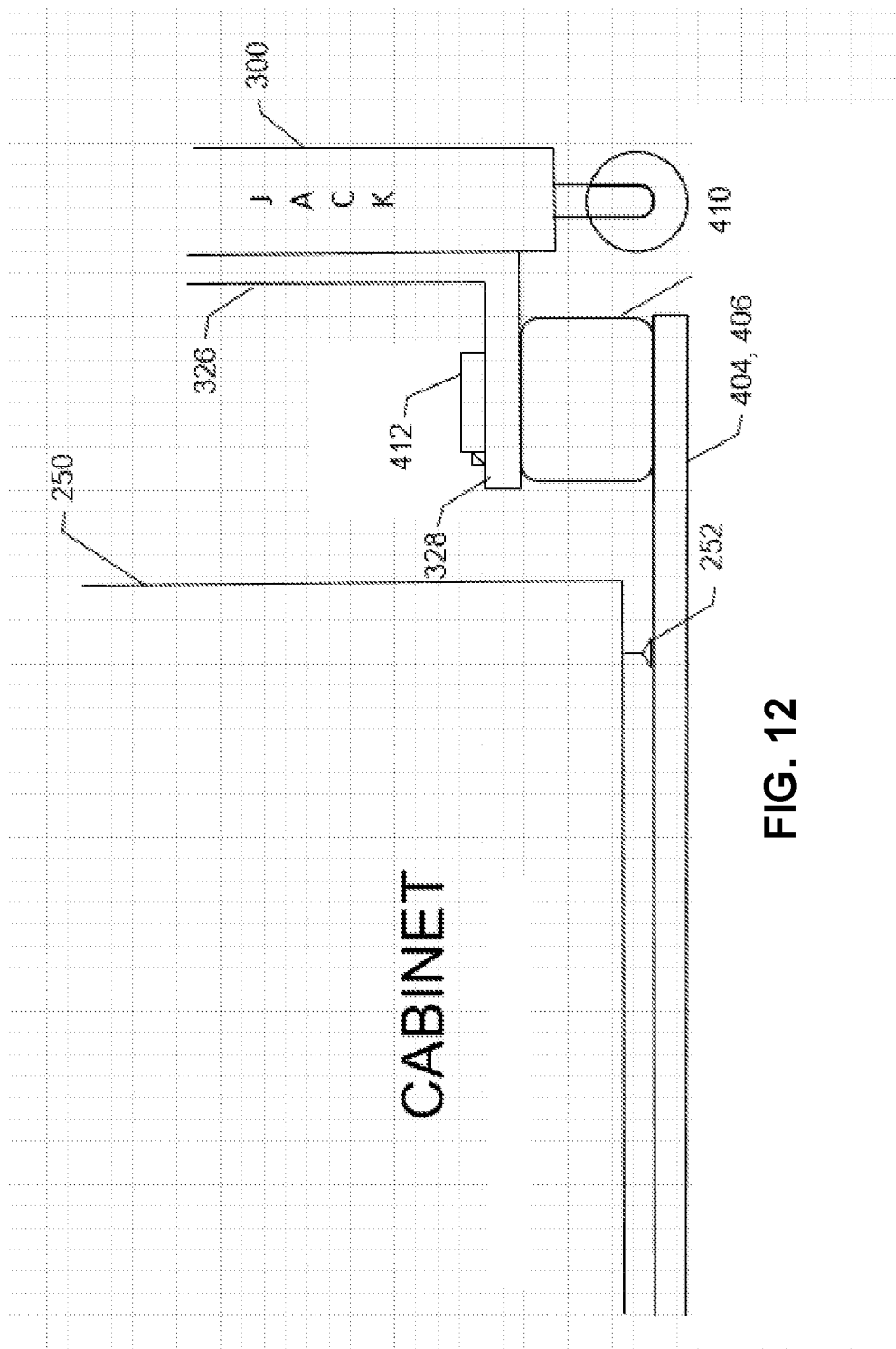
FIG. 12 is a side schematic view illustrating the attachment of a lifting device to the support assembly in accordance with an aspect of the innovation.
Figure 13:
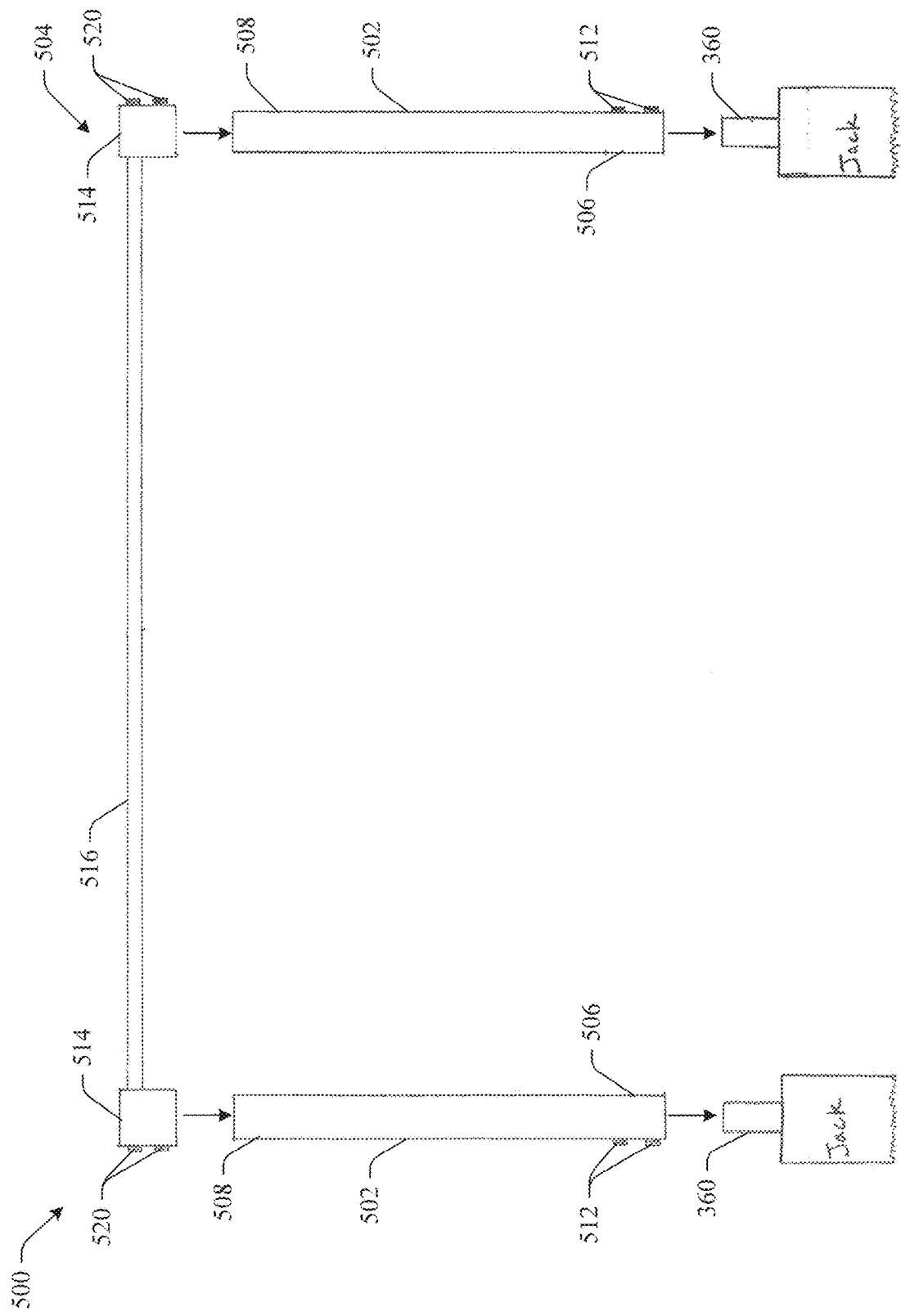
FIG. 13 is a plan view of a stabilizer support assembly in accordance with an aspect of the innovation.
Figure 14:
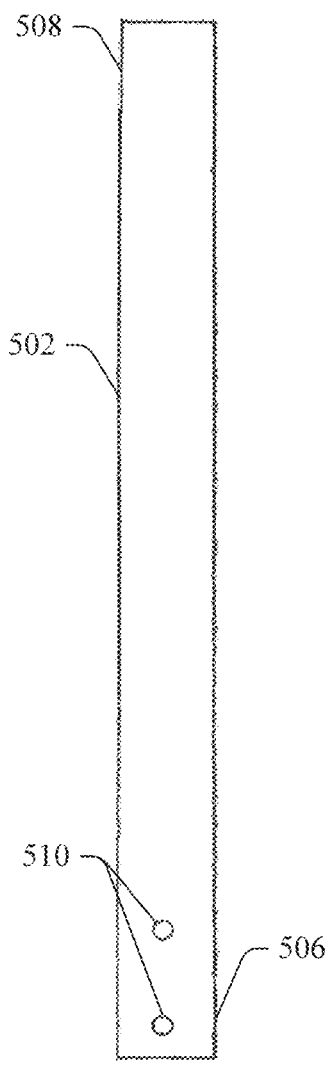
FIGS. 14 and 15 are different side views of a vertical stabilizer support of the stabilizer support assembly in accordance with an aspect of the innovation.
Figure 15:
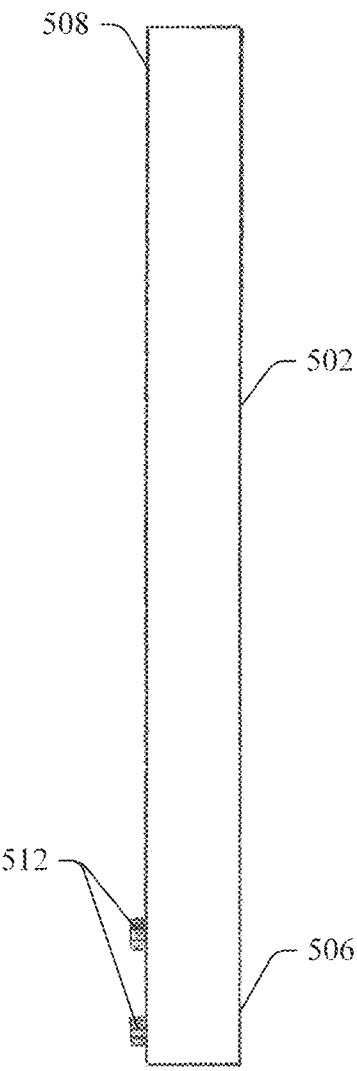
Figure 16:
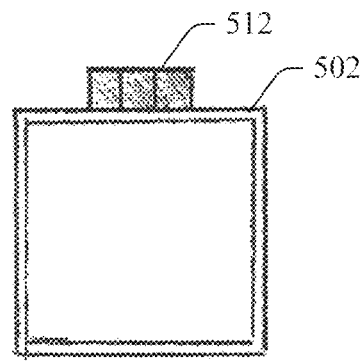
FIG. 16 is an end view of the vertical stabilizer support of the stabilizer support assembly in accordance with an aspect of the innovation.
Figure 17:
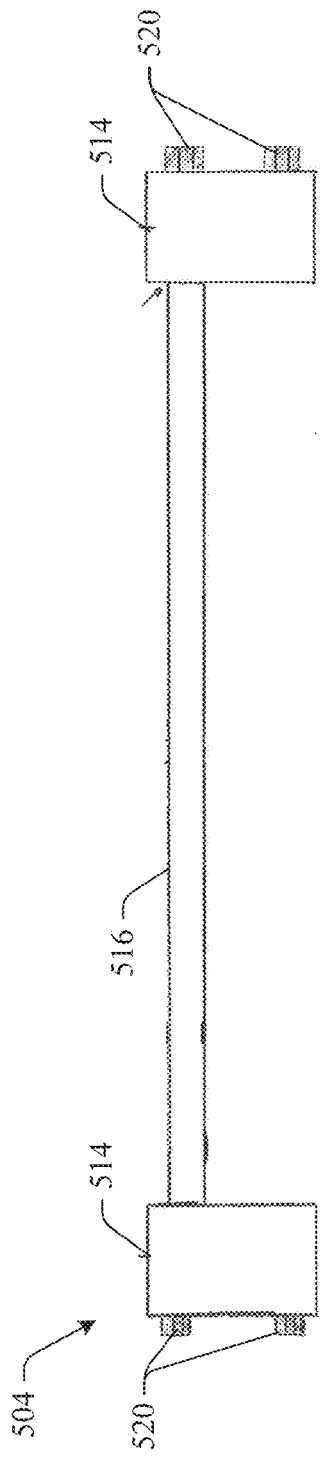
FIG. 17 is a side view of an overhead stabilizer support of the stabilizer support assembly in accordance with an aspect of the innovation.
Figure 18:
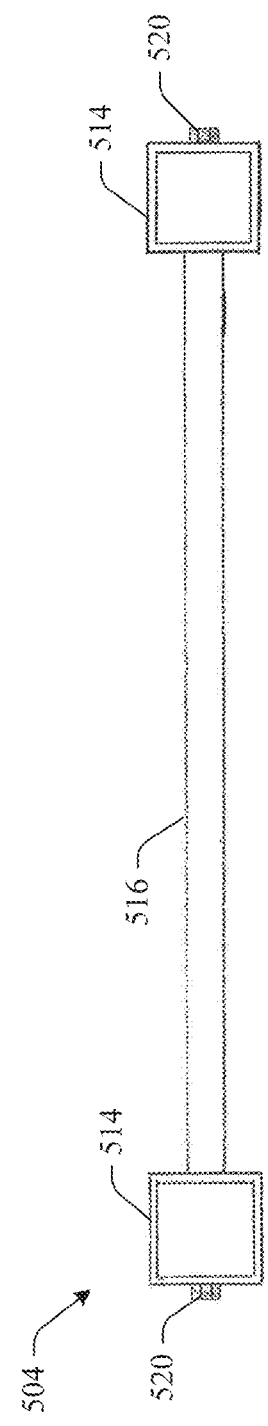
FIG. 18 is a top view of the overhead stabilizer support of the stabilizer support assembly in accordance with an aspect of the innovation.
Figure 19:
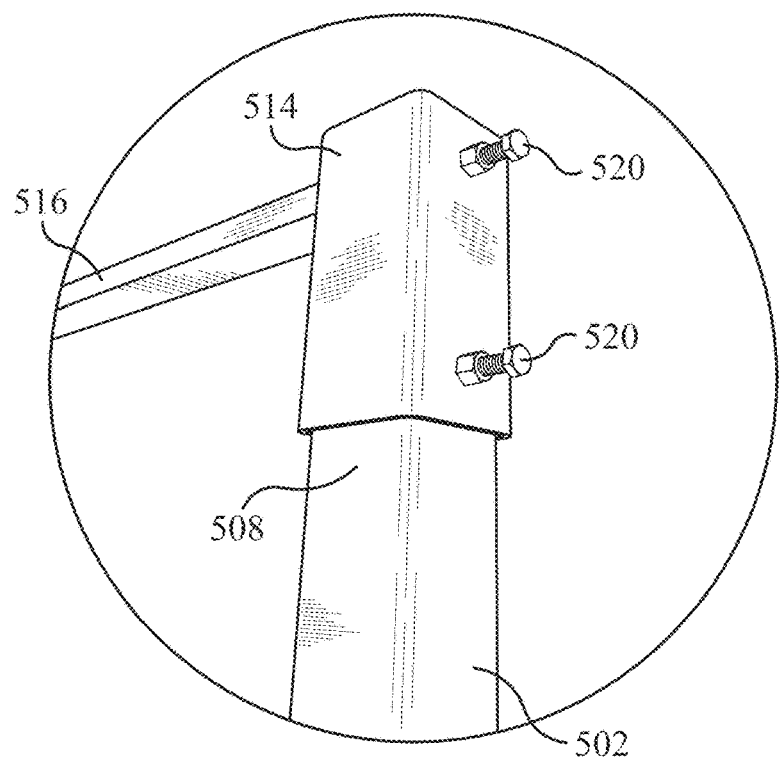
FIGS. 19 and 20 are close up views illustrating the connection of the stabilizer support assembly in accordance with an aspect of the innovation.
Figure 20:
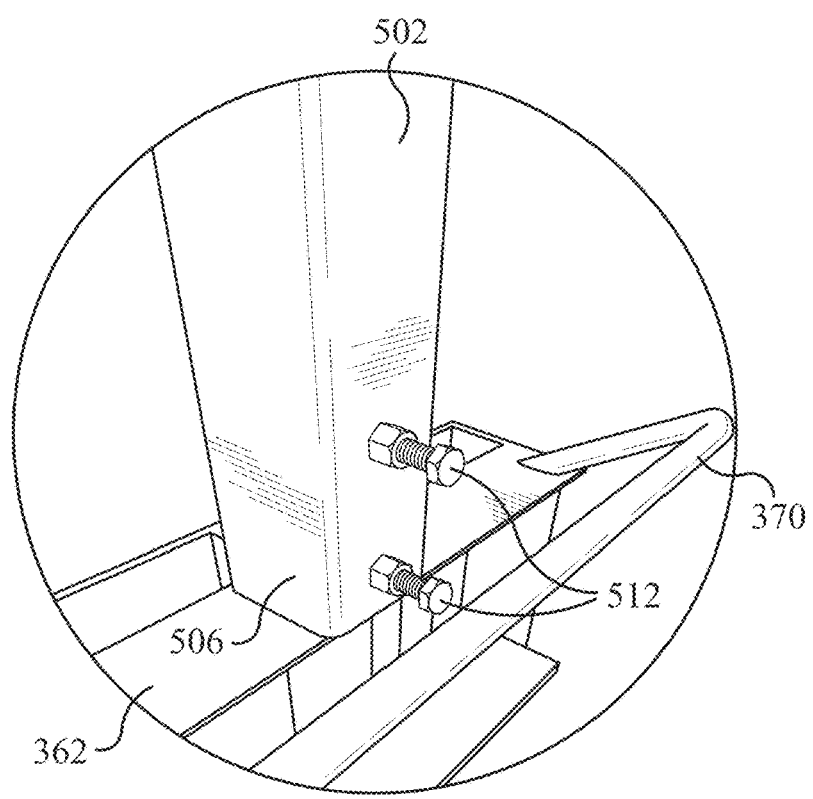

Each side support assembly 402 includes a bottom (first) side support 410 and a top (second) side support 412 that is disposed on top of the bottom side support 410. The bottom side support 410 includes end apertures 414 defined therein for attachment of the end cross supports 404, intermediate apertures 416 defined therein for attachment of the intermediate cross supports 406, and studs 418 (e.g., threaded studs) for attachment of the top side support 412. The top support 412 includes apertures 420 that align with the studs 418 on the bottom side support 410 when the top support 412 is placed on the bottom side support 410. Fasteners (e.g., bolts) engage the studs 418 to secure the top side support 412 to the bottom side support 410. As shown in FIGS. 5 and 12, the horizontal portion 328 of the fork assembly 320 is secured between the bottom side support 410 and the top side support 412 via the studs 418. The bottom and top side supports 410, 412 can have different cross section, such as but not limited to, flat plate, square, rectangular, tubular, etc.

The end cross members 404 include apertures 422 defined therein at opposite ends of the end cross member 404. The apertures 422 align with the end apertures 414 defined in the bottom side support 410 to thereby attach the end cross members 404 to the bottom side support 410. Fasteners 424, such as but not limited to, screws, nuts and bolts, etc. may be used to attach the end cross members 404 to the bottom side supports 410. The end cross members 404 may include a channel 426 that receives a foot 252 of the cabinet 250 (see FIG. 10) that reduces slippage of the cabinets 250 during transport.

Figure 11:
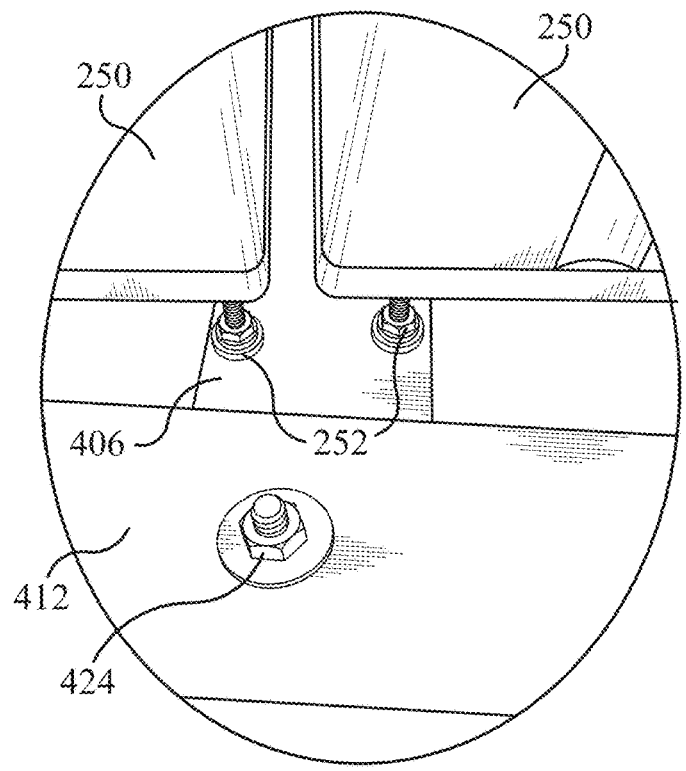
FIG. 11 is a close-up view of an intermediate cross member attached to the bottom side support in accordance with an aspect of the innovation.

The intermediate cross members 406 include apertures 428 defined therein at opposite ends of the end cross member 404. The apertures 428 align with the intermediate apertures 416 defined in the bottom side support 410 to thereby attach the intermediate cross members 406 to the bottom side support 410. Fasteners 424, such as but not limited to, screws, nuts and bolts, etc. may be used to attach the end cross members 404 to the bottom side supports 410. As shown in FIG. 11, the intermediate cross members 406 have a width to accommodate feet 252 from adjacent cabinets 250. Thus, the feet 252 rest on a top surface of the intermediate members 406. The cross members can have different cross section, such as but not limited to, flat plate, square, rectangular, tubular, etc.

Referring to FIGS. 13-20, FIG. 13 is an exploded view of a stabilizer assembly 500 in accordance with an aspect of the innovation. The stabilizer assembly 500 attaches to a lift/moving device 300 on each side of the moving system 200 to provide stability to the cabinets while in transport. There can be one or more stabilizer assemblies 500 in each moving system 200 based on the number of cabinets to be transported. The stabilizer assembly 500 includes a pair of vertical stabilizer supports 502 and an overhead stabilizer support assembly 504.

The vertical stabilizer supports 502 are tubular (e.g., hollow) and have a first end 506 and a second end 508. The vertical stabilizer supports 502 have a geometric cross section (e.g., square, rectangular, circular, etc.) such that the first end 506 of the vertical stabilizer support 502 fits over the stabilizer tube 360 described above. The vertical stabilizer supports 502 further include apertures 510 defined therein near the first end 506. The apertures 510 are configured to receive fasteners 512 (e.g., screw, bolt, quick disconnect, etc.) that act as a set screw whereby the fastener 512 threads into the aperture 510 and tightens against the stabilizer tube 360 thereby securing the vertical stabilizer support 502 to the lifting/moving device 300.

The overhead stabilizer support 504 includes a pair of stabilizer tube connecting portions 514 and a stabilizer bar 516 that connects the pair of connecting portions 514 to each other. The stabilizer bar 516 may be attached to each of the connecting portions 514 by any mechanical means, such as but not limited to, welding, fasteners, etc. The connecting portions 514 are tubular (e.g., hollow) and have a similar, but larger geometric cross section as the vertical stabilizer supports 502, such that the second end 508 of the vertical stabilizer supports 502 fits inside the connecting portion 514. The connecting portions 514 further include apertures defined therein that are configured to receive fasteners 520 (e.g., screw, bolt, quick disconnect, etc.) that act as a set screw whereby the fasteners 520 threads into the apertures and tightens against the vertical stabilizer supports 502 thereby securing connecting portions 514 and the overhead stabilizer support 504 to the vertical stabilizer supports 502 and ultimately to the lifting/moving device 300.

Figure 21:
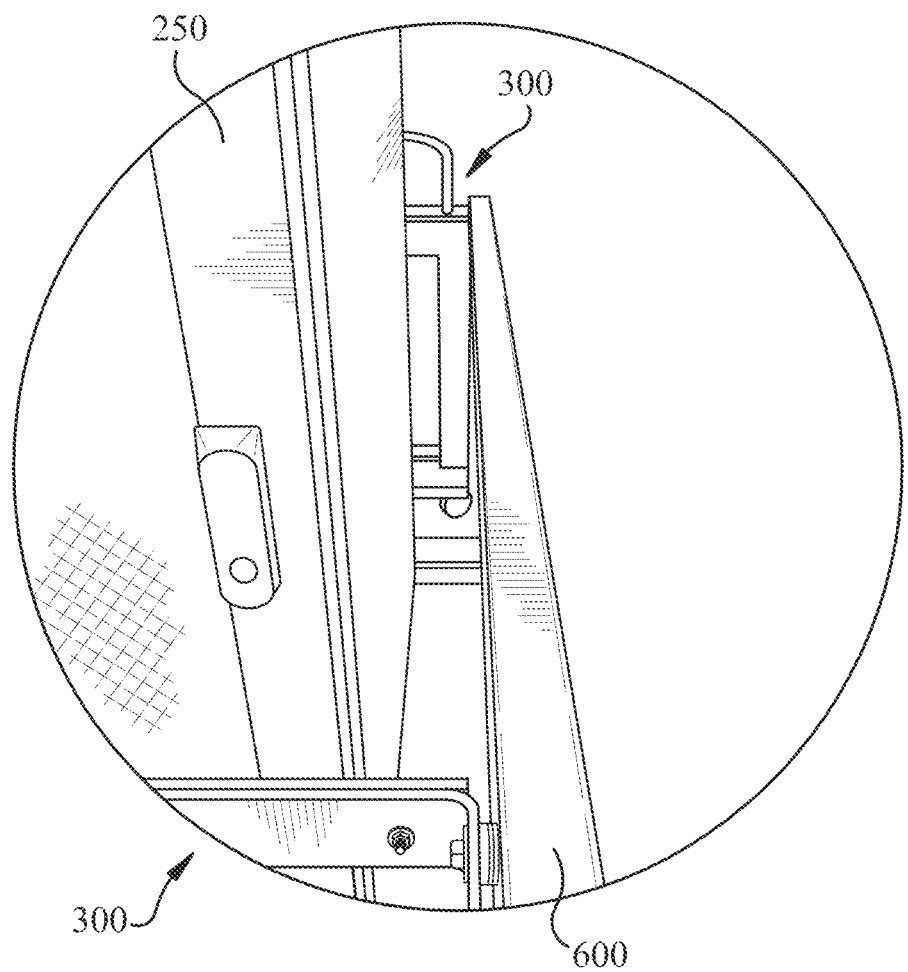
FIG. 21 is a view of an end bracket attached to the lifting/moving devices in accordance with an aspect of the innovation.

Referring to FIGS. 2, 3, and 21, the end braces (brackets) 600 attach to an outer portion of the lifting/moving devices 300 disposed on opposite ends of the support assembly 400. The braces 600 provide support, stability, and inhibit the cabinet from moving, falling, etc. The braces 600 include multiple apertures 602 whereby fasteners attach the braces 600 to the lifting/moving device 200. The braces 600 may be an elongated flat plate, an L-bracket, a C-channel, etc.

Figure 22:
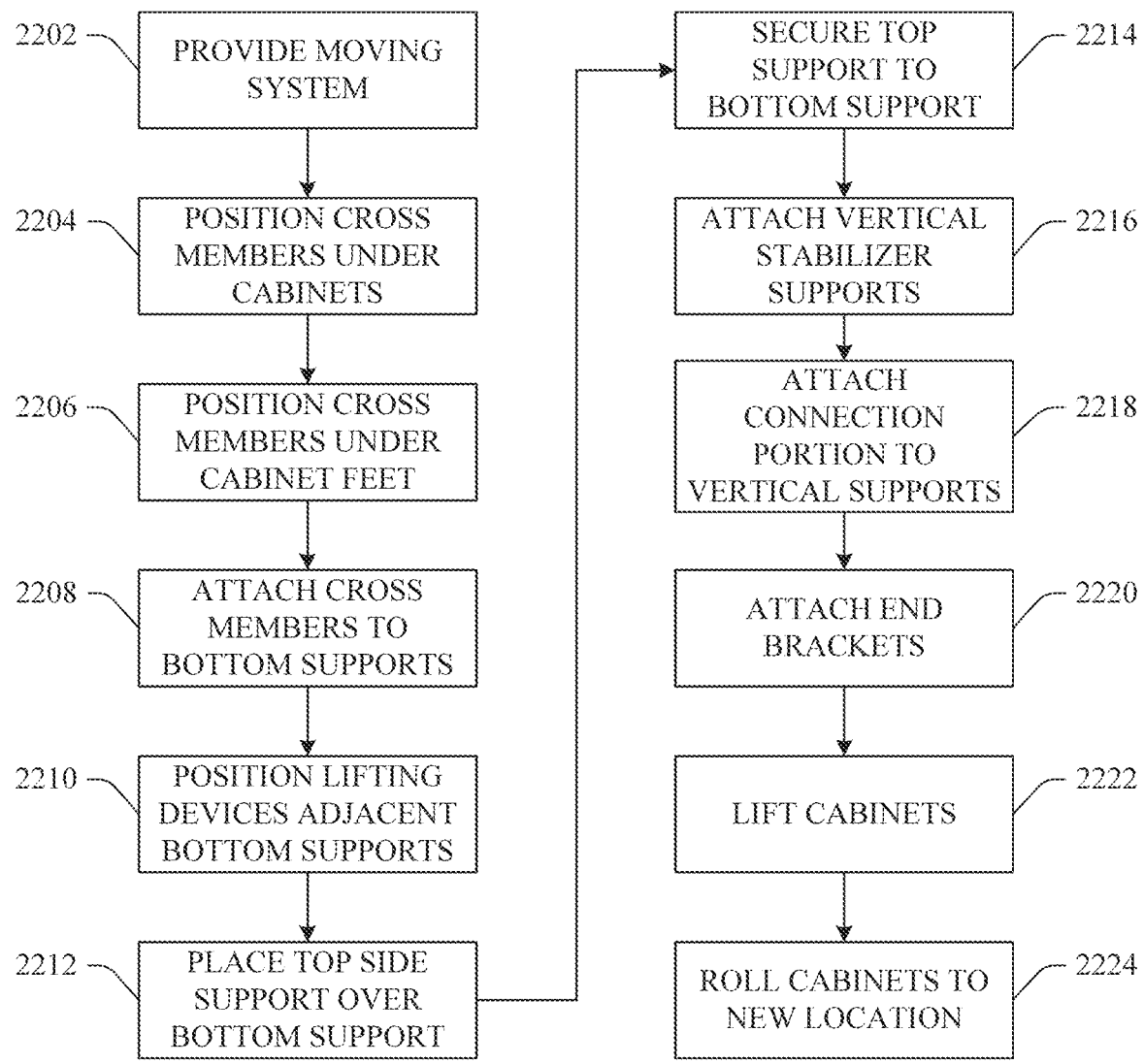
FIG. 22 is a block diagram illustration of a method of relocating IT cabinets containing IT equipment in accordance with an aspect of the innovation.

Referring to FIG. 22, a method of relocating multiple interconnected IT cabinets will now be describe in accordance with an aspect of the innovation. At 2202, a system configured to relocate interconnected IT cabinets is provided. At 2204, positioning cross members 404, 406 under the cabinets 250 adjacent to the feet 252 of each cabinet. At 2206, positioning the cross members 404, 406 under the feet of each cabinet such that the feet 252 rest on the cross members 404, 406. At 2208, attaching both ends of the cross members 404, 406 to the bottom side support 410. At 2210, positioning the lifting/moving devices 300 adjacent to both bottom side supports 410 such that the horizontal portion 328 of the fork assembly 320 is positioned on a top surface of the bottom side supports 410. At 2212, placing the top side support 412 over the horizontal portion 328 of the fork assembly 320. At 2214, securing the top side support 412 to the bottom side support 410 via fasteners. At 2216, attaching the first end 506 of the vertical stabilizer supports 502 to the stabilizer tube 360 as described herein. At 2218, attaching the stabilizing tube connecting portions 514 to the second end 508 of the vertical stabilizer supports 502 as described herein. At 2220, attaching the end brackets 600 to the lifting/moving devices 300 as described herein. At 2222, simultaneously lifting the support assembly 400 and hence, the IT cabinets 250 off the floor surface. At 2224, simultaneously rolling the lifting/moving devices 300 and hence, the IT cabinets to a new location.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:
1. A method for relocating interconnected IT cabinets comprising:
   positioning a plurality of cross members of a moving system under each interconnected IT cabinet such that each interconnected IT cabinet rests on one of the cross members;
   attaching both ends of each of the cross members to bottom side supports of the moving system;
   positioning a lifting device comprising a fork assembly adjacent to each of the bottom side supports such that a horizontal portion of the fork assembly is positioned on a top surface of the bottom side supports;
   placing a top side support over the horizontal portion of each fork assembly;
   securing each top side support to each bottom side support via fasteners;

attaching a first end of vertical stabilizer supports to a stabilizer connection tube disposed on each of the lifting devices;

attaching a pair of stabilizer tube connecting portions to a second end of the stabilizer supports; and lifting simultaneously the interconnected IT cabinets off a floor surface.

2. The method of claim 1, further comprising, prior to lifting simultaneously the interconnected IT cabinets off the floor surface, attaching an end bracket to an outer portion of each of the lifting devices disposed on opposite ends of the bottom side supports.

3. The method of claim 1, wherein the cross members are positioned such that a foot of each cabinet of the interconnected IT cabinets rests on one of the cross members.

4. The method of claim 3, wherein positioning the cross members includes positioning each cabinet foot in a channel formed in each of the cross members, each channel configured to receive a respective cabinet foot such that each cabinet foot rests within each respective channel.

5. The method of claim 1, wherein the lifting device includes a lifting mechanism comprising one or more of a hydraulic jack or a pneumatic jack.

6. The method of claim 1, wherein attaching the first end of vertical stabilizer supports to a stabilizer connection tube disposed on each of the lifting devices further comprises securing at least a portion of the stabilizer connection tube within the first end of the vertical stabilizer supports.

7. The method of claim 1, further comprising connecting the pair of stabilizer tube connecting portions via a stabilizer bar.

8. The method of claim 1 wherein securing the top side support to the bottom side support comprises aligning studs on the bottom side support with apertures in the top side support, wherein the fasteners engage the studs to secure the top side support to the bottom side support.

9. The method of claim 8 wherein the horizontal portion of the fork assembly is secured between the bottom side support and the top side support via the studs.

10. A method for relocating interconnected IT cabinets comprising:

positioning the interconnected IT cabinets on a moving assembly, the moving assembly comprising:

a support assembly comprising a pair of side support assemblies, each pair comprising a bottom side support and a top side support, and a plurality of cross members;

a plurality of lifting devices configured to engage with the support assembly and lift and move the support assembly, each lifting device comprising a moveable fork assembly; and a stabilizer assembly, positioning a foot of a cabinet of the interconnected IT cabinets on a cross member of the plurality of cross members such that the foot rests on the cross member;

attaching both ends of each of the plurality of cross members to the bottom side supports;

positioning the lifting devices adjacent to the bottom side supports such that a horizontal portion of each moveable fork assembly is positioned on a top surface of each bottom side support;

positioning the top side supports over the horizontal portion of the moveable fork assembly;

securing the top side support to the bottom side support; and securing the stabilizer assembly to the lifting devices on each side of the moving assembly.

11. The method of claim 10, wherein the moving assembly comprises at least two stabilizer assemblies.

12. The method of claim 10, wherein securing the stabilizer assembly to lifting devices on each side of the moving assembly further comprises securing at least a portion of a lifting device stabilizer tube within a vertical stabilizer support, such that the vertical stabilizer support is secured to the lifting devices.

13. The method of claim 12, wherein the vertical stabilizer is secured to the lifting devices by tightening the vertical stabilizer support against the stabilizer tube via an aperture in the vertical stabilizer support configured to receive a fastener.

14. The method of claim 10 wherein securing the top side support to the bottom side support comprises aligning studs on the bottom side support with apertures in the top side support, wherein fasteners engage the studs to secure the top side support to the bottom side support.

15. The method of claim 14 wherein the horizontal portion of each fork assembly is secured between each bottom side support and each top side support via the studs.

16. The method of claim 10, wherein the plurality of cross members include end cross members and intermediate cross members, the end cross members comprising apertures at each end and wherein attaching the cross members to the bottom side supports comprises aligning the end cross members apertures with corresponding end apertures in the bottom side supports and fastening the end cross members and the bottom side supports.

17. The method of claim 16, wherein positioning the foot of the cabinet on the cross member comprises positioning the foot in a channel on one of the end cross members.

18. A method for relocating interconnected IT cabinets comprising:

positioning a moving assembly around at least a portion of the interconnected IT cabinets, the moving assembly comprising:

a support assembly comprising a pair of side support assemblies, each pair comprising a bottom side support and a top side support, and a plurality of cross members;

a plurality of lifting devices configured to engage with the support assembly and lift and move the support assembly, each lifting device comprising a moveable fork assembly; and a stabilizer assembly comprising an overhead stabilizer that extends over the interconnected IT cabinets, positioning each cabinet of the interconnected IT cabinets to rest on a cross member of the plurality of cross members;

attaching both ends of each of the plurality of cross members to the bottom side supports;

positioning the lifting devices adjacent to the bottom side supports such that a horizontal portion of each moveable fork assembly is positioned on a top surface of each bottom side support;

positioning the top side supports over the horizontal portion of the moveable fork assemblies;

securing the top side supports to the bottom side supports; and securing the stabilizer assembly to the lifting devices on each side of the moving assembly and over the interconnected IT cabinets.

19. The method of claim 18, wherein the stabilizer assembly further comprises a pair of vertical stabilizer supports and wherein securing the stabilizer assembly to the lifting devices on each side of the moving assembly further comprises:
- securing the vertical stabilizer supports to the overhead stabilizer;
- securing at least a portion of a lifting device stabilizer tube within a vertical stabilizer support; and
- securing the vertical stabilizer support to the lifting device.

20. The method of claim 18, wherein wherein positioning each cabinet includes positioning a foot of each cabinet in a channel formed in each of the cross members, each channel configured to receive a respective cabinet foot such that each cabinet foot rests within each respective channel.

* * * * *